(12) United States Patent
Shu et al.

(10) Patent No.: US 11,914,744 B2
(45) Date of Patent: Feb. 27, 2024

(54) INTELLIGENT CONTEXTUAL HELP CHAT IN A MULTI-TENANT DATABASE SYSTEM

(71) Applicant: Salesforce, Inc., San Francisco, CA (US)

(72) Inventors: Gang Shu, San Francisco, CA (US); Jong Lee, Pleasanton, CA (US); Florence Cheung, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 324 days.

(21) Appl. No.: 17/219,464

(22) Filed: Mar. 31, 2021

(65) Prior Publication Data
US 2022/0318423 A1   Oct. 6, 2022

(51) Int. Cl.
| | | |
|---|---|---|
| *G06F 21/62* | (2013.01) | |
| *G06F 21/10* | (2013.01) | |
| *G06F 16/9535* | (2019.01) | |
| *G06F 16/2457* | (2019.01) | |
| *G06Q 30/016* | (2023.01) | |
| *H04L 51/02* | (2022.01) | |

(52) U.S. Cl.
CPC .... *G06F 21/6245* (2013.01); *G06F 16/24575* (2019.01); *G06F 16/9535* (2019.01); *G06F 21/105* (2013.01); *G06Q 30/016* (2013.01); *H04L 51/02* (2013.01)

(58) Field of Classification Search
CPC ............... G06F 21/6245; G06F 21/105; G06F 16/24575; G06F 16/9535; G06Q 30/016; H04L 51/02

USPC .......................................................... 726/28
See application file for complete search history.

(56) References Cited

U.S. PATENT DOCUMENTS

| | | |
|---|---|---|
| 8,565,422 B2 | 10/2013 | Lee et al. |
| 8,646,048 B2 | 2/2014 | Lee |
| 8,762,947 B2 | 6/2014 | Lee et al. |
| 8,763,098 B2 | 6/2014 | Lee |
| 9,032,488 B2 | 5/2015 | Lee |
| 9,584,505 B2 | 2/2017 | Lee |
| 9,965,613 B2 | 5/2018 | Lee |
| 10,044,702 B2 | 8/2018 | Lee |
| 10,277,583 B2 | 4/2019 | Lee |
| 10,496,673 B2 | 12/2019 | Lee et al. |
| 10,540,369 B2 | 1/2020 | Lee et al. |
| 10,885,179 B2 | 1/2021 | Lee |
| 2016/0307210 A1* | 10/2016 | Agarwal .......... G06Q 10/06316 |
| 2018/0336337 A1 | 11/2018 | Lee |
| 2020/0026713 A1 | 1/2020 | Lee et al. |
| 2020/0192718 A1* | 6/2020 | Jia ......................... H04L 67/306 |

* cited by examiner

*Primary Examiner* — Michael S McNally
(74) *Attorney, Agent, or Firm* — Kwan & Olynick LLP

(57) ABSTRACT

Disclosed are some implementations of systems, apparatus, methods and computer program products for providing contextually relevant recommendations based on a context of the user. The context of the user may be determined according to a set of privacy settings of the user, where the set of privacy settings indicates contextual features for which values are permitted to be accessed by a recommendation system. The contextual features may include user-related features and/or tenant features pertaining to a tenant of a multi-tenant database.

20 Claims, 10 Drawing Sheets

INTELLIGENT CONTEXTUAL HELP CHAT IN A MULTI-TENANT DATABASE SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with multi-tenant database systems. More specifically, this patent document discloses techniques for providing contextually relevant assistance within a multi-tenant database system.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed systems, apparatus, methods and computer program products for facilitating contextual assistance within a multi-tenant database system. These drawings in no way limit any changes in form and detail that may be made by one skilled in the art without departing from the spirit and scope of the disclosed implementations.

DETAILED DESCRIPTION

Figure 1:
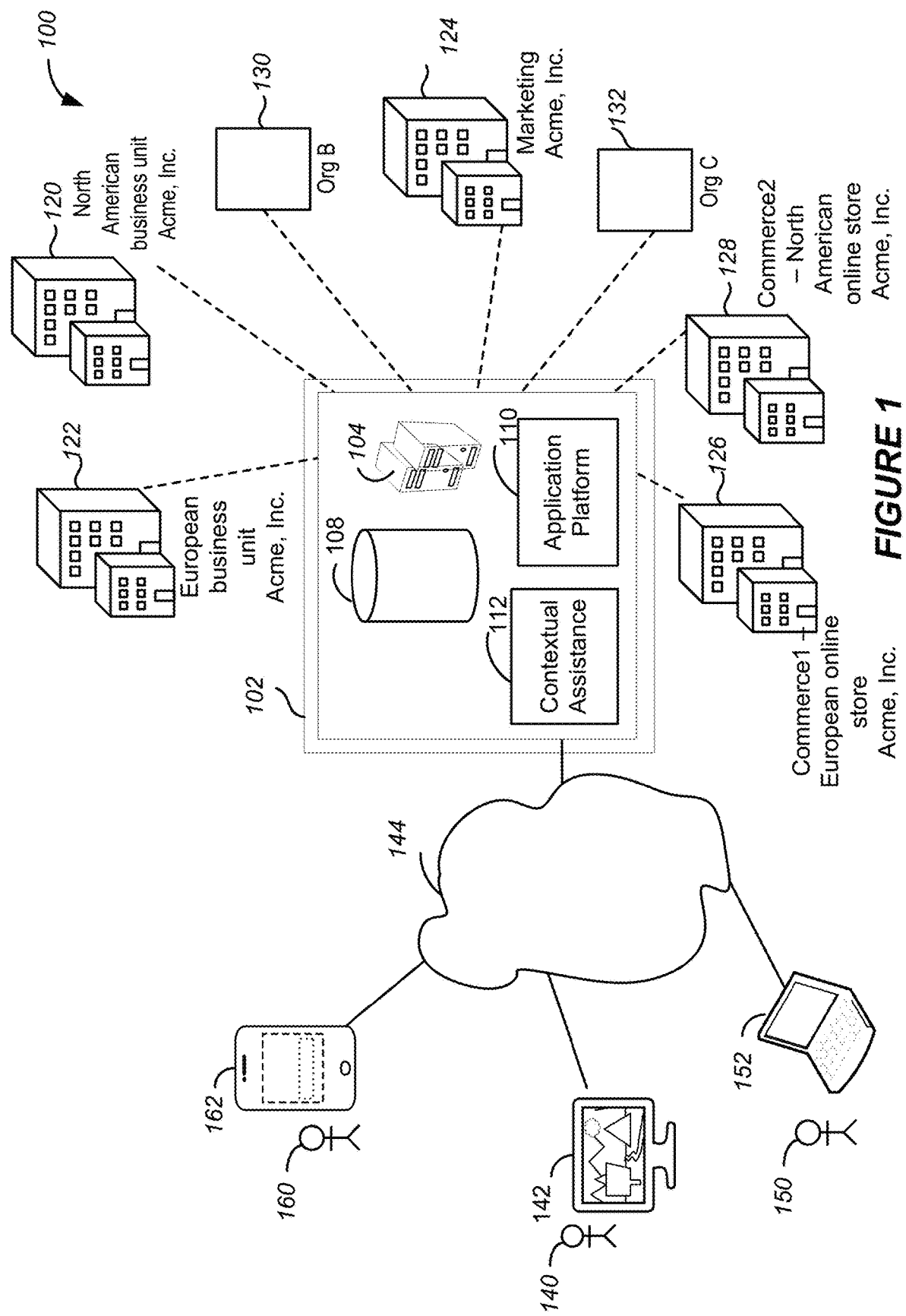
FIG. 1 shows a system diagram of an example of a system 100 in which contextual assistance may be facilitated in a multi-tenant database system, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus, and computer program products for providing contextually relevant assistance to users of a database system. In some implementations, the database system is in the form of at least one multi-tenant database system. The tenants of the database system may include various organizations of users who interact with cloud-based applications running on the database system or on platform(s) associated with the database system. An organization may be associated with one or more tenants of a multi-tenant database system.

Today, many computing systems offer customer support in the form of an online chat service. An online chat service provides assistance in real-time to users who connect to the chat service. Often, chat services employ individuals as customer service "chat agents." In many instances, chat services are supported by artificial intelligence (AI) bots.

When a user connects to an online chat service, they are typically tasked with describing the problem they are facing. However, in many instances, the user does not have the vocabulary to accurately describe their circumstances.

Moreover, even if the user provides a description of their problem, they may overlook key contextual factors that could have contributed to their issue. As a result, the information that a user provides to a chat agent or bot is often inadequate.

Another issue with conventional chat systems is that AI bots and customer support individuals are limited in their ability to gather the information they need to provide a satisfactory solution to a user's problem. In some instances, AI bots and customer support individuals are not adequately trained to ask questions that would prompt the user to give useful contextual information. In other instances, the user may be unaware of factors that might impact their situation or lead to an optimal recommendation.

Online chat services are implemented by a variety of businesses. In some instances, an online chat service provides assistance regarding a product or service that the user accessed or is currently accessing. Within an organization, an online chat service may be implemented to provide assistance to users who access software products provided by the organization to the users. Software products may include computer-readable instructions installed on a client device and/or may provide software as a service over a network.

In accordance with various implementations, a database system provides contextually relevant assistance to a user of a database system. The system may provide assistance in the form of a set of user-selectable options (e.g., questions) from which the user can select to describe the reason they are seeking assistance. In addition, the system may provide information that enables the user to solve their problem. In some instances, the system may provide a recommendation that identifies knowledge articles or other resources, learning modules accessible via an online learning system, or further product(s) that either might resolve the user's problem or might otherwise be useful to the user. In other instances, the system may recommend a new or additional product feature, provide guidance in relation to use or access of a recommended product feature, or provide information that enables a product feature to be set up or customized.

In the following description, assistance is provided within the context of an online chat service. As described herein, assistance may be provided to a user who seeks help via an online chat service. However, it is important to note that these examples are merely illustrative. In other implementations, assistance may be provided automatically without initiation by a user. Furthermore, assistance may be provided via a variety of applications such as an application that provides a home screen or web page for display by a client device.

In some implementations, assistance is provided by an AI bot or customer service individual. More particularly, the user's context may be determined and transmitted to an AI bot or customer service individual. The AI bot or individual may then apply the user's context to provide assistance to the user.

In accordance with various implementations, the system determines the users context based, at least in part, on a user profile associated with the user. A user profile may store information relating to the user's online activities such as the users browsing history, search history, purchase history, web page viewing history, etc. By accessing the user profile, the system may gather useful contextual information that the user would not otherwise provide. The users context may also include any user-provided contextual information.

In some implementations, the user's context is further determined based, at least in part, on tenant information associated with the tenant (e.g., organization) providing the software product for use by the user. Tenant information can indicate resources available to the tenant. For example, the tenant information can identify software products purchased, number of licenses purchased, number of licenses used, amount of storage available, and/or amount of storage used. Since the tenant information is generally not known or accessible to users, this information has not traditionally been available during an online chat session.

In accordance with various implementations, a user can control the contextual data that can be accessed by or otherwise disclosed to the system. More particularly, the user may establish privacy settings that indicate their preferences with respect to specific contextual features. Example contextual features may include, but are not limited to, the user's geographic location, the users profile type, the use's license type, the user's role, the user's browsing history (e.g., recent clicks, recent page views), the users search history, the users purchase history, and/or the users viewing history. The user's context may then be determined within the boundary established by the users privacy settings.

By way of illustration, Acme Corporation purchases five tenants of a multi-tenant database system. A first tenant is implemented as an instance of Marketing, a second tenant is implemented as an instance of Commerce (e.g., an online store) for their North American business unit, a third tenant is implemented as an instance of Commerce for their European business unit, a fourth tenant is implemented as a Core instance that facilitates managing the North American business unit, and a fifth tenant is implemented as a Core instance that facilitates managing the European business unit.

An employee user within the North American business unit of Acme Corporation connects with an online chat service because their computer is not operating properly. The system accesses the users user profile to determine the users privacy settings, and determines the user's context within the bounds of the user's privacy settings. More particularly, the system determines a context of the user based, at least in part, on the user profile and tenant information associated with the fourth tenant (and any additional user-provided information that indicates that the user is having issues with their computer). The system determines, from the tenant information, the software products available to users having the user profile type and role type of the user. In addition, the system determines from the tenant information that the tenant has three unused licenses for a software product that is not installed on the client device of the user, as indicated by the user profile. The system then recommends that the user install the software product on their device. The user installs the software product and finds that their problem is resolved.

FIG. 1 shows a system diagram of an example of a system 100 in which contextual assistance may be facilitated in a multi-tenant database system, in accordance with some implementations. In FIG. 1, database system 102 includes any number of computing devices such as servers 104. The servers 104 are in communication with one or more storage mediums 108 configured to store and maintain relevant data and/or metadata used to perform some of the techniques disclosed herein, as well as store and maintain data and/or metadata generated by the techniques disclosed herein. Storage mediums 108 may further store computer-readable instructions configured to perform some of the techniques described herein. Storage mediums 108 can also store user profiles, tenant information, and/or database records such as customer relationship management (CRM) records. In addition, the database system 102 may include a platform 110 having hardware and/or software, e.g., the operating system, which may be configured to perform some of the techniques described herein.

Various tenants of system 100 are supported by one or more tenant database systems. For example, a tenant database system may include a multi-tenant database system. The tenant database systems may be independent from or integral with system 102. Each tenant database system may support a one or more tenants. To simplify the illustration, it is assumed that tenant database system(s) are integral with system 102.

Each tenant database system may include any number of computing devices such as servers, which may be in communication with one or more storage mediums configured to store and maintain tenant data generated by or otherwise maintained by tenants of the tenant database system. In this example, storage mediums 108 include tenant data storage. For example, the tenant data storage can store data for each tenant of one or more multi-tenant database(s). Tenant storage of the multi-tenant database system may further store computer-readable instructions used by tenants to perform some of the techniques disclosed herein. In addition, the tenant storage may store metadata or other information received and/or generated by the tenants as described herein.

Application platform 110 of the tenant database system may be a framework that allows applications of the tenant database system to run. For example, the application platform may include hardware and/or software, e.g., the operating system. In some implementations, the application platform 110 supports the creation, managing and executing of one or more applications.

In some implementations, system 102 is configured to store and maintain user profiles associated with users of system 102 in storage mediums 108. More particularly, a user profile may store credentials such as a username and password. In addition, a user profile may include privilege information identifying or specifying access rights and/or restrictions of a corresponding user. In some implementations, a user profile includes information such as a user identifier (ID), location (e.g., work, home, and/or current location), type of user profile, user license type, role of the user, a community to which the user belongs, a particular organization on behalf of which a community is maintained, an organization associated with the user, and/or a tenant identifier associated with a tenant associated with the user. Each of the communities may be operated on behalf of an organization. Each organization may have associated therewith one or more tenants, which may each be associated with one or more communities.

In FIG. 1, tenants 120, 122, 124, 126, and 128 are operated on behalf of Org A, which in this example is Acme Corporation. Tenant 130 is operated on behalf of Org B and tenant 132 is operated on behalf of Org C. In FIG. 1, tenant 120 is operated on behalf of Acme Corporation's North American core business unit, tenant 122 is operated on behalf of Acme Corporation's European core business unit, tenant 124 is operated on behalf of Acme Corporation's Marketing operations, tenant 126 is operated on behalf of Acme Corporation's European online store, and tenant 128 is operated on behalf of Acme Corporation's North American online store.

In accordance with various implementations, system 102 includes Contextual Assistance System 112. Contextual Assistance System 112 may be configured to facilitate the configuration of privacy settings associated with users of system and/or retrieval of privacy settings from user profiles. Contextual Assistance System 112 may also facilitate the determination of a user context. Once a user context is determined, Contextual Assistance System 112 may provide the user context to a chat service individual and/or a recommendation system. In some implementations, a recommendation system includes an AI chat bot configured to provide recommendations to users.

In database oriented computing systems and environments in which the present techniques can be implemented, the actions of users when interacting with cloud-based applications may cause data to be accessed from the tenant database system, cause data and/or metadata to be generated and stored in the tenant database system, or cause data and/or metadata to be modified in the tenant database system. Non-limiting examples of system events corresponding to user activity include, by way of illustration, a login or a logout, a uniform resource identifier (URI) which may represent a page click and view, an application programming interface (API) call, a record access, a page request, or other type of system request. For example, a URI may include a uniform resource locator (URL).

In some implementations, system 102 updates user profiles based, at least in part, on user interactions with system 102. For example, user profiles may be updated to reflect user browsing history such that accesses of web pages provided by system 102 are recorded. Specifically, the browsing history can include an identifier of a URI and a timestamp of the date and/or time of access of the URI by the user. User profiles may also be updated based upon search and/or other user activities such as access of product features. For each activity, a timestamp may be recorded.

Client devices 142, 152, 162 may be in communication with system 102 via network 144. More particularly, client devices 142, 152, 162 may communicate with servers 104 via network 144. For example, network 144 can be the Internet. In another example, network 144 comprises one or more local area networks (LAN) in communication with one or more wide area networks (WAN) such as the Internet.

Embodiments described herein are often implemented in a cloud computing environment, in which network 144, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, users 140, 150 of client computing devices 142, 152 have accounts at Salesforce.com®. By logging into their accounts, users 140, 150 can access the various services and data provided by system 102. In some implementations, users need not have an account to access services provided by system 102. User 160 of client computing device 162 is a customer support agent. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users of client devices 142, 152, 162 can access services provided by system 102 via platform 110 or an application installed on client devices 142, 152, 162. For example, client devices 142, 152 can log into system 102 via an application programming interface (API) or via a graphical user interface (GUI) using credentials of corresponding users 140, 150 respectively.

In some implementations, a user 140 accesses an application such as an online chat service via network 144 using computing device 142. Contextual Assistance System 112 determines the user's context and assists the user. More particularly, the user's context may be provided to a customer support agent or automated system such as an AI chat bot. A recommendation suitable for the user's context may then be provided to the user, as will be described in further detail below.

In accordance with various implementations, a user may control the features for which contextual data is provided to, accessed by, or otherwise exposed to the system for use in providing contextual assistance. This may be accomplished through the configuration of a set of privacy settings.

Figure 2:
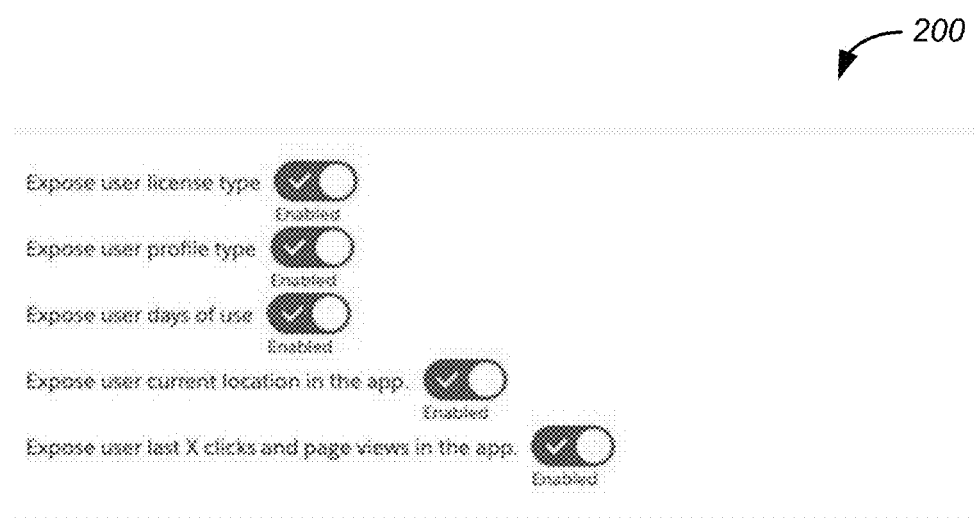
FIG. 2 shows an example of a graphical user interface (GUI) 200 configured to facilitate the configuration of privacy settings, in accordance with various implementations.

FIG. 2 shows an example of a graphical user interface (GUI) 200 configured to facilitate the configuration of privacy settings, in accordance with various implementations. GUI 200 provides a plurality of user-selectable options, where each option corresponds to a corresponding one of a plurality of contextual features. In this example, the contextual features include a user license type, a user profile type, user days of use of the system, user current location, user last clicks and/or user last page views. For each option, the user may submit an indication of whether they would like to expose a value corresponding to the contextual feature to the system. Thus, for a given contextual feature, the user may submit input indicating that the user either wishes to expose the value corresponding to the contextual feature or that the user does not wish to expose the value corresponding to the contextual feature. Once configured, a set of privacy settings indicating the user's preferences may be stored in association with the user profile.

It is important to note that the contextual features shown in FIG. 2 are merely illustrative. Thus, a user may configure privacy settings for a variety of contextual features.

In some implementations, a user may configure privacy settings corresponding to those contextual features for which values have been stored in the user profile. In other words, the privacy settings may be configured for user features of the user. User features can pertain to access by the user to the system and/or a particular application.

User features can include a variety of features pertaining to the user's online activity, system accesses, and/or resources available to the user. Example user features include, but are not limited to: an application or software product currently being accessed by or recently accessed by the user, a current location (e.g., web address or URL) of an application accessed by the user, a database record accessed via the current location in the application, a user license type pertaining to the application or software product (e.g., service), user profile type, user hierarchy role, user days of use, user current location, user emails, and/or URIs that have been accessed. A URI can include a uniform resource locator (URL) or link. In some implementations, a user feature may indicate the web pages or documents that the user recently accessed. Recent accesses by the user may be determined based upon a predefined number of documents or may be determined according to accesses that occurred within a predefined period of time. For example, the most recent documents may include the last 10 documents the user accessed or the documents the user accessed within the last hour.

Example user license types include a customer relationship management (CRM) license, service cloud license, and knowledge license. Each license may confer the ability to access a corresponding set of resources (e.g., applications and/or data).

A user profile type may similarly indicate the data and/or applications that the user has authority to access. Example user profile types include administrator, standard, and custom.

A user hierarchy role may similarly confer the ability to access data and/or applications. Example roles include manager, supervisor, engineer, administrator, sales, etc.

In some implementations, a user may configure privacy settings corresponding to contextual features for which values are stored in tenant information. In other words, privacy settings may be configured for organizational features. In other implementations, a user cannot control whether values corresponding to organizational features are exposed to the system.

Organizational features may indicate the resources available to an organization and its users. Resources can include, for example, software product resources, memory resources, and/or processor resources.

Example organizational features associated with an organization include, but are not limited to: an edition of a software product purchased by the organization, an organization status with respect to the software product, an organizational feature set of the software product that is available to users of the organization, and/or an organizational age with respect to the software product.

An organizational edition may refer to a specific version of a plurality of versions of the product that are available. Example editions include an essentials edition, a professional edition, and an enterprise edition. Each edition may provide a corresponding set of features or services to users of the organization.

The organizational status of an organization may indicate the status of the organization in relation to purchase of the software product. For example, an organization status may include trial, active, or free.

An organizational feature set may indicate the features available to users of the software product. In other words, each feature set may provide a corresponding set of features or services that are available to users of the software product. Example feature sets include, but are not limited to, community, activity platform, and knowledge.

The age of an organization may indicate an amount of time remaining to sign the organization up for the software product. For example, if the organizational status is trial, the amount of time remaining may be equal to the time remaining in a trial period.

In some implementations, organizational features indicate the number of licenses available. More particularly, the organizational features can include information indicating the number of feature licenses available and/or the number of user licenses available. The information can include, for example, the number of licenses (e.g., user and/or feature licenses) purchased and/or the number of licenses used.

Organization features may also indicate the amount of storage available. More particularly, the organizational features may indicate the amount of data storage available and/or the amount of file storage available. For example, the organizational features may indicate the amount of storage (e.g., data and/or file storage) purchased and/or the amount of storage used.

Once the user has configured their privacy settings, the privacy settings may be stored in association with the user profile. The system may access the user's privacy settings prior to accessing data corresponding to contextual features. For example, the user's privacy settings may be accessed in response to initiation by the user of a help chat session.

In accordance with various implementations, the user may click on a "Chat" button or other user interface element presented within a GUI to launch a help chat session. The chat session may be initiated while the user is accessing an application such as CRM application.

The system determines the user context within the bounds of the user's privacy settings, as described in further detail below-. The system may then transmit the user context to a customer support agent or automated recommendation system. In this manner, a connection may be established between the user and a chat agent or automated recommendation system.

Figure 3:
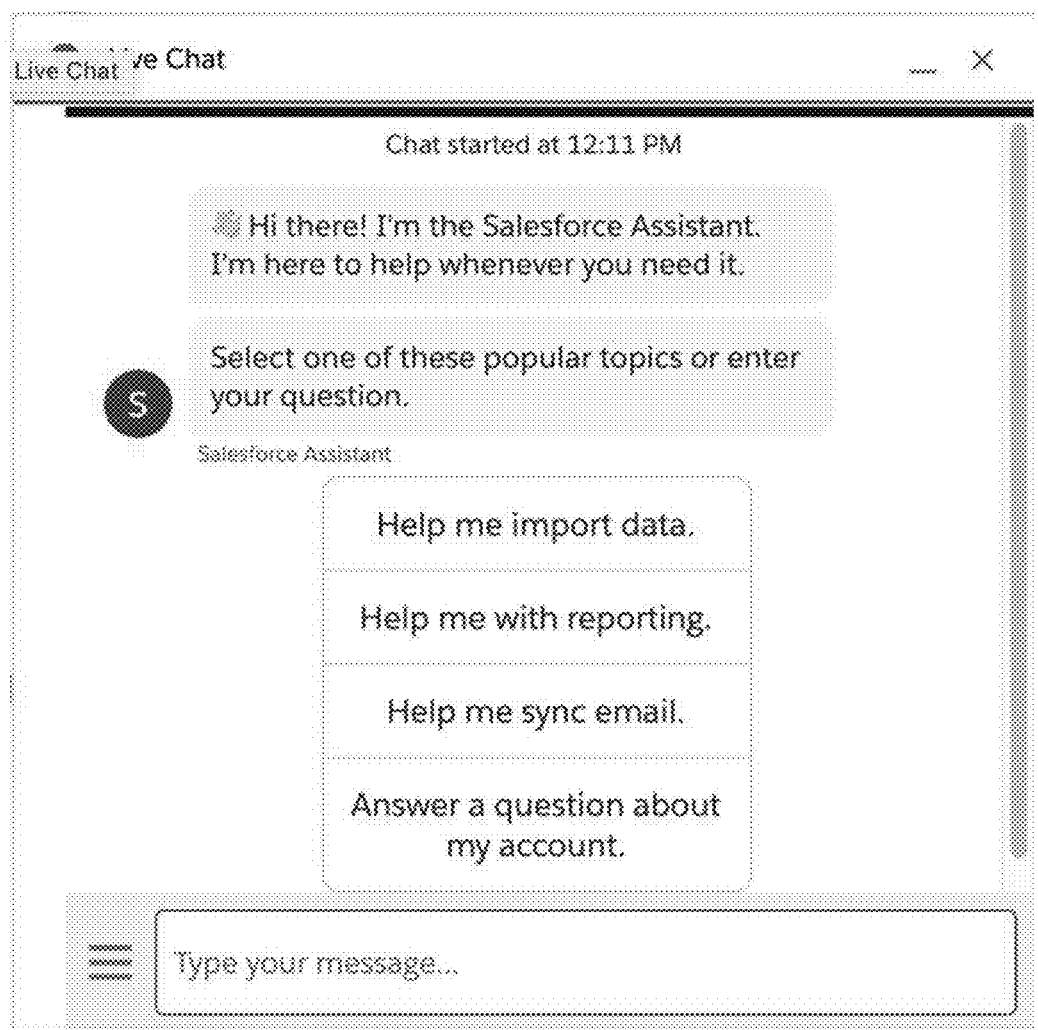
FIG. 3 shows an example of a GUI 300 illustrating a chat interface that may be presented, in accordance with various implementations.

The system may apply an algorithm such as a machine learning model to the user's context to generate a contextually relevant recommendation. In some implementations, a recommendation is provided to the user at the start of the chat session. FIG. 3 shows an example of a GUI 300 illustrating a chat interface that may be presented, in accordance with various implementations. GUI 300 may present topics or suggested questions that are selected based on the user's context.

As shown in FIG. 3, the proposed topics are "Help me import data," "Help me with reporting," "Help me sync email," and "Answer a question about my account." The user may select one of the suggested topics/questions or enter their own question to proceed with the chat session.

The chat session may continue without requiring the user to exit an application, enabling in-application recommendations to be provided. As one example, the user may be interacting with a CRM application.

Figure 4A:
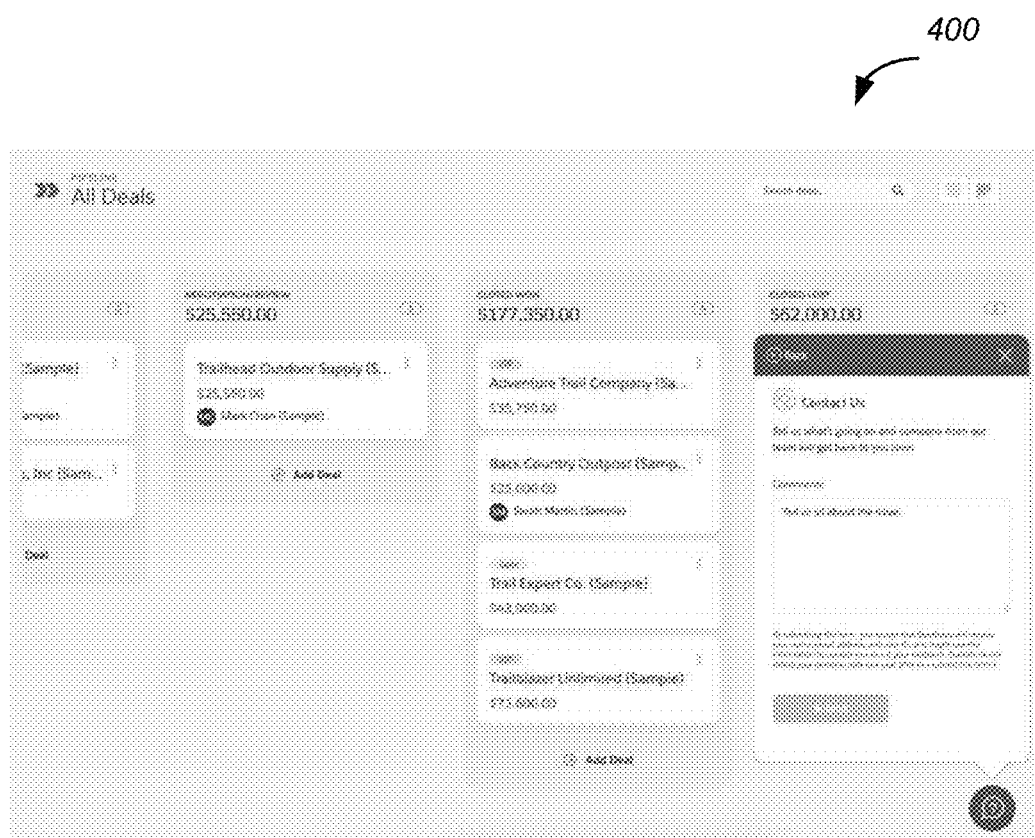
FIG. 4A shows an example of a GUI 400 illustrating a chat interface, in accordance with various implementations.

FIG. 4A shows an example of a GUI 400 illustrating a chat interface presented within the context of a CRM application, in accordance with various implementations. The system may gather the user's context based, at least in part, on recent web pages/clicks of the user within the application. In this example, the user is currently viewing a web page that presents data from database record(s) of the database system. Since the user is viewing information associated with a particular deal, the user's context generated by the system may include information gathered from the web page and/or associated database record(s).

Figure 4B:
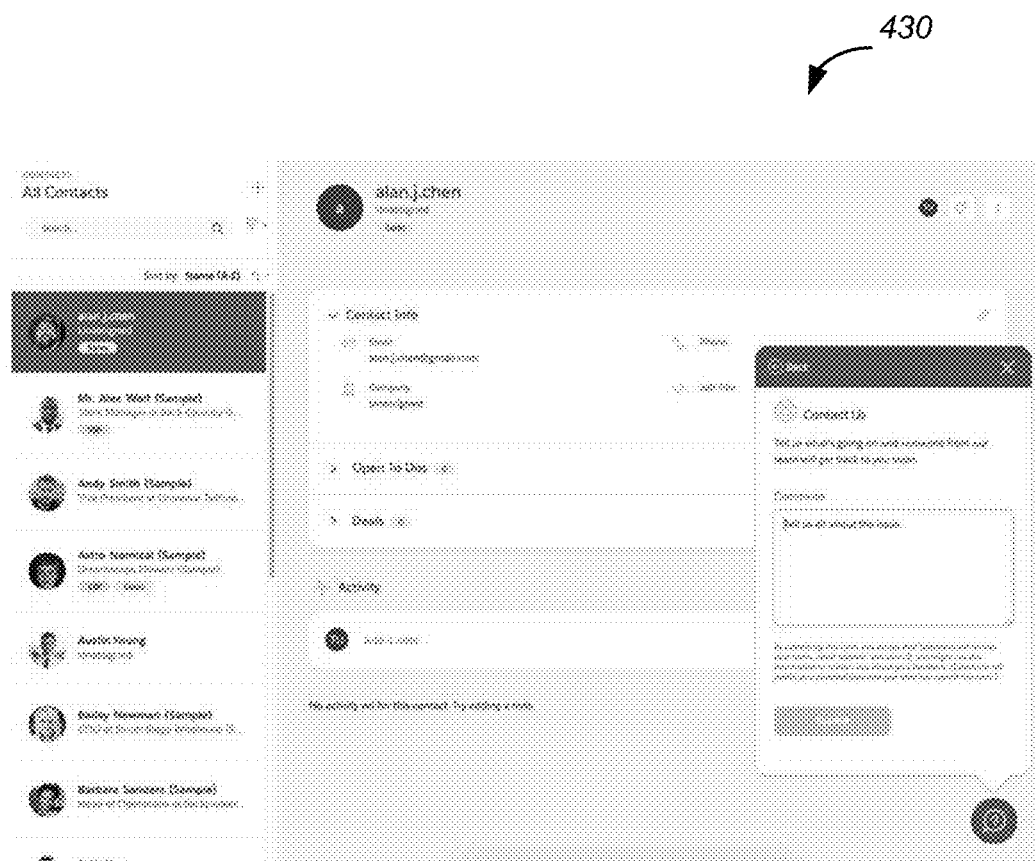
FIG. 4B shows another example of a GUI 430 illustrating a chat interface, in accordance with various implementations.

FIG. 4B shows another example of a GUI 430 illustrating a chat interface, in accordance with various implementations. In this example, the user is viewing information associated with a particular contact. Therefore, the user context that is determined may include information associated with the contact, as obtained from the web page and/or corresponding database record(s).

The user may access the contextual help chat service from a variety of applications. For example, the user may access the chat service while accessing his or her electronic mail or other electronic messages.

Figure 4C:
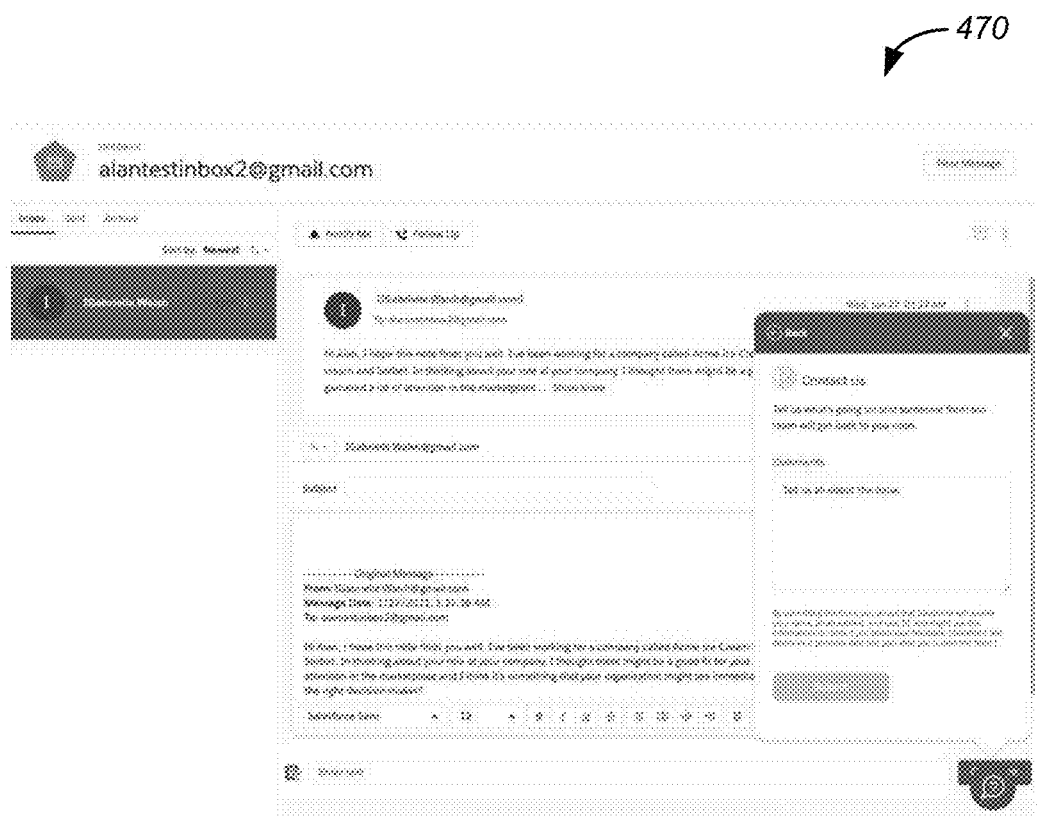
FIG. 4C shows another example of a GUI 470 illustrating a chat interface, in accordance with various implementations.

FIG. 4C shows another example of a GUI 470 illustrating a chat interface presented within the context of an electronic mail system, in accordance with various implementations. Since the user is accessing their inbox, the user's context determined by the system may include information currently or recently accessed by the user via their inbox. For example, the information may include terms in an email being read by the user and/or terms typed by the user via an interface presented by the email system.

Figure 5:
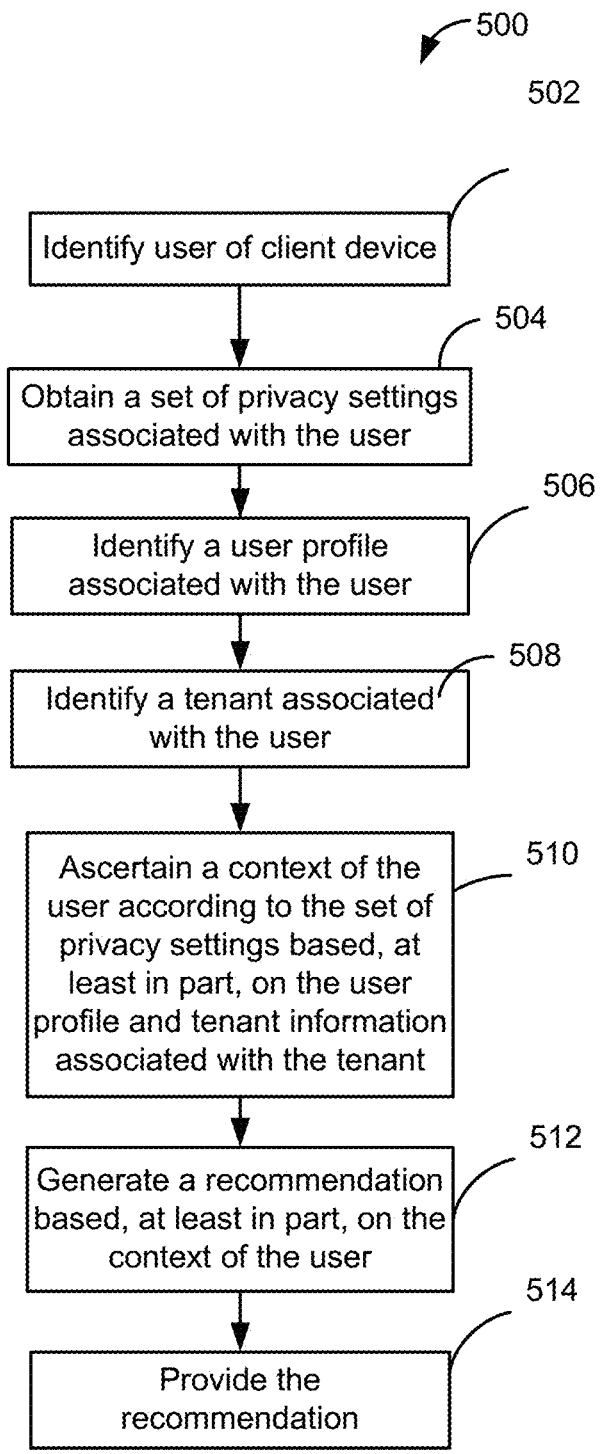
FIG. 5 shows an example of a method 500 for providing contextual assistance, in accordance with some implementations.

FIG. 5 shows an example of a method 500 for providing contextual assistance, in accordance with some implementations. A user may launch a help chat service while accessing an application such as a CRM or email application via a client device. The user of the client device may be identified at 502 based, at least in part, on a message received from the client device. For example, the message may include an IP address, a MAC address, and/or user identifier.

A set of privacy settings associated with the user is obtained at 504, where the set of privacy settings includes one or more indicators. The set of privacy settings may be obtained from a user profile associated with the user or, alternatively, may be obtained from the client device during a configuration process, as described herein. Each of the indicators may indicate whether access to a value of a corresponding one of a plurality of contextual features by the system is permissible. For example, an indicator, when in a first state, may indicate that the value of the corresponding contextual feature may be accessed by the system for purposes of contextual assistance. Similarly, the indicator, when in a second state, may indicate that the value of the corresponding contextual feature may not be accessed by the system for purposes of contextual assistance. The contextual features may include one or more user features and one or more tenant/organizational features.

In the event that the user does not establish a set of privacy settings, a default set of privacy settings may be applied. Alternatively, the user may choose to modify one or more indicators within the default set of privacy settings.

A user profile associated with the user may be identified at 506. In addition, a tenant associated with the user may be identified at 508, where the tenant is one of a plurality of tenants of a multi-tenant database. For example, a tenant identifier of the tenant may be ascertained from the user profile. As another example, an identifier of an organization may be ascertained from the user profile, enabling a corresponding tenant identifier to be determined.

A context of the user is ascertained according to the set of privacy settings based, at least in part, on the user profile and tenant information associated with the tenant at 510. The tenant information may indicate one or more resources available to the tenant, as described herein. For example, resources may include applications, licenses, memory, and/or processor resources.

In some implementations, the context may be further ascertained based, at least in part, on an indication of a source of the message received from the client device. For example, the indication may identify a particular web page, application, and/or software product currently accessed by the user.

In some implementations, the system may identify contextual information that is pertinent to an application currently accessed by the user and/or a current location within the application. For example, the system may determine license information associated with the application and/or related software products.

The context may include values corresponding to at least a portion of the contextual features. For example, the context may include value(s) corresponding to at least one tenant feature and at least one user feature.

The context of the user may be transmitted to a customer service agent and/or provided to an automated recommendation system. For example, the context may be transmitted with an indication of a help chat request to the customer service agent or recommendation system. The system may generate a recommendation for the user at 512 based, at least in part, on the user's context. In some implementations, the system implements a decision tree that analyzes the context to determine an optimal recommendation for the user. In some implementations, the system may apply an algorithm that considers dependencies among software products.

In some implementations, the user's context is represented as a vector that is applied using a machine learning model to predict an optimal solution or recommendation for the user. More particularly, the machine learning model may include a plurality of variables corresponding to contextual features, where the machine learning model includes weights corresponding to the variables. Through the use of a machine learning model, it is possible to weight the contextual features (as permitted by the user's privacy settings) to generate a recommendation for the user. For a contextual feature for which the user has not enabled system access, the weight may be set to zero.

The machine learning model may be trained using training data corresponding to a plurality of users of the system. More particularly, the training data may include a context of each of the users, a recommendation provided to the user, and an indication of success or failure of the recommendation. Success or failure may be determined based, at least in part, on whether the recommendation was deemed by the user to successfully solve the user's problem.

The recommendation may be provided to the user at 514. In some implementations, the recommendation may be provided in real-time via a GUI presented via the user's client device.

A recommendation may identify informational resources that are predicted to be useful to the user. For example, the informational resources may include internal resources (e.g., documents or web pages) that are internal to the system and/or external resources (e.g., URIs or hypertext links) that are external to the system.

In some implementations, a recommendation identifies educational resources that the user can access via an online learning system. For example, an educational resource may include a learning module or path that is recommended for the user.

The recommendation may also identify information pertaining to an application or other software product the user is currently accessing or has recently accessed. In some implementations, the recommendation identifies one or more related software products that are recommended for the user and/or license information, which may pertain to software product(s) accessed by the user or recommended software product(s). The license information may indicate whether a license is available for the recommended product(s). In addition, the license information may indicate a process for accessing or downloading the recommended product(s) and/or obtaining a license. For example, the recommendation may include a hypertext link that enables the user to obtain a recommended product and/or associated license.

In some implementations, the recommendation announces a new product feature or recommends an additional product feature that the user has not previously accessed. The recommendation may also provide guidance in relation to use or access of a product feature within the context of the user. In addition, the recommendation may provide or identify information (e.g., articles, videos, etc.) that facilitates the set up or customization of a product feature.

After the recommendation has been provided, the user may be asked to provide feedback regarding the quality of the recommendation. An indication of the user's feedback may be stored in association with the user's context and recommendation in the user profile and/or a log of recommendations. The machine learning model may subsequently be updated based, at least in part, on the user's feedback, the user's context, and the recommendation provided.

While the above implementations are described with reference to a user-initiated chat session, it is important to note that these examples are merely illustrative. In other implementations, contextually relevant recommendations may be surfaced automatically. Moreover, recommendations may be provided within a variety of application contexts including, but not limited to, an onboarding process and home screen applications.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level networking systems in conjunction with the disclosed techniques.

Figure 6A:
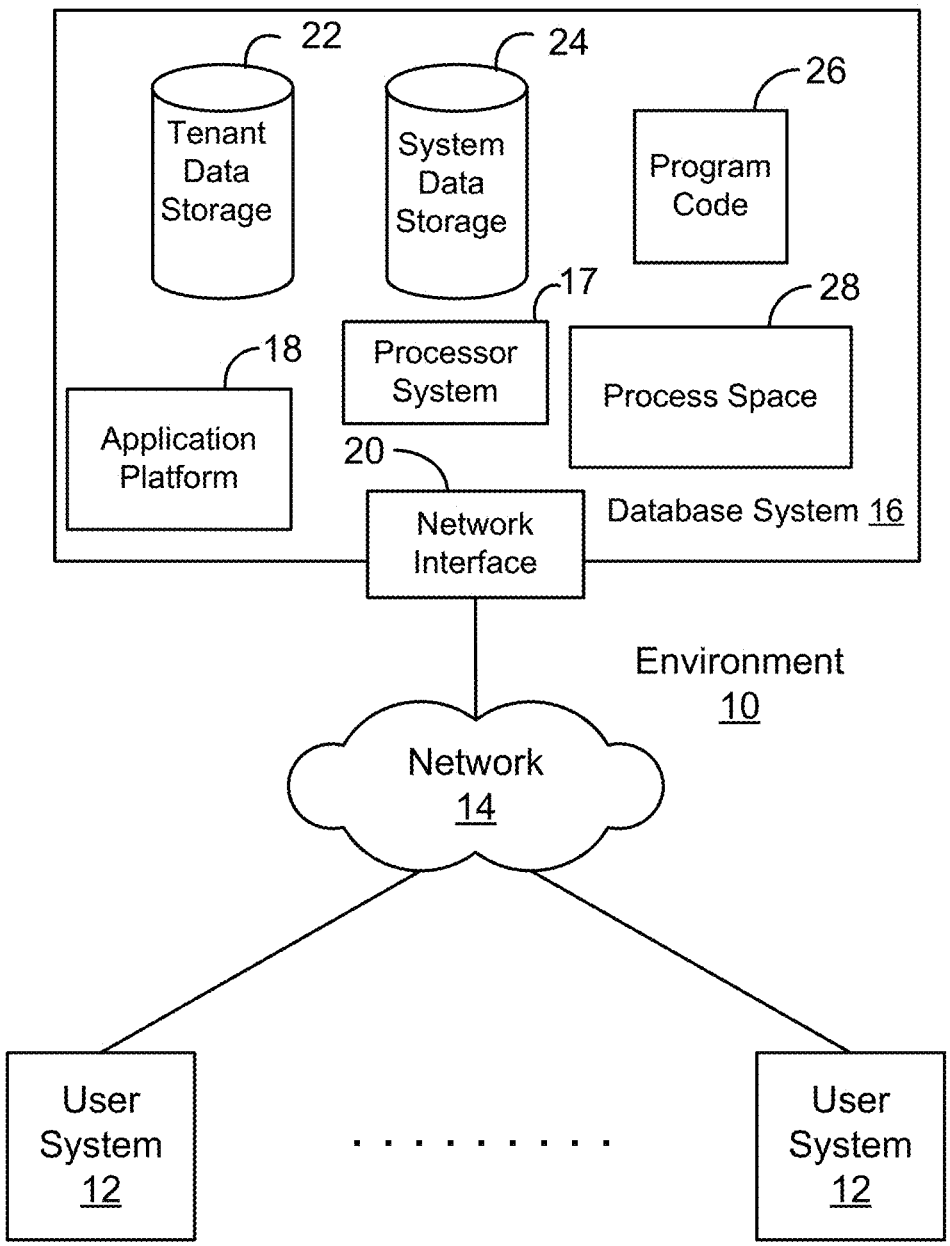
FIG. 6A shows a block diagram of an example of an environment 10 in which an on-demand database service can be used in accordance with some implementations.

FIG. 6A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
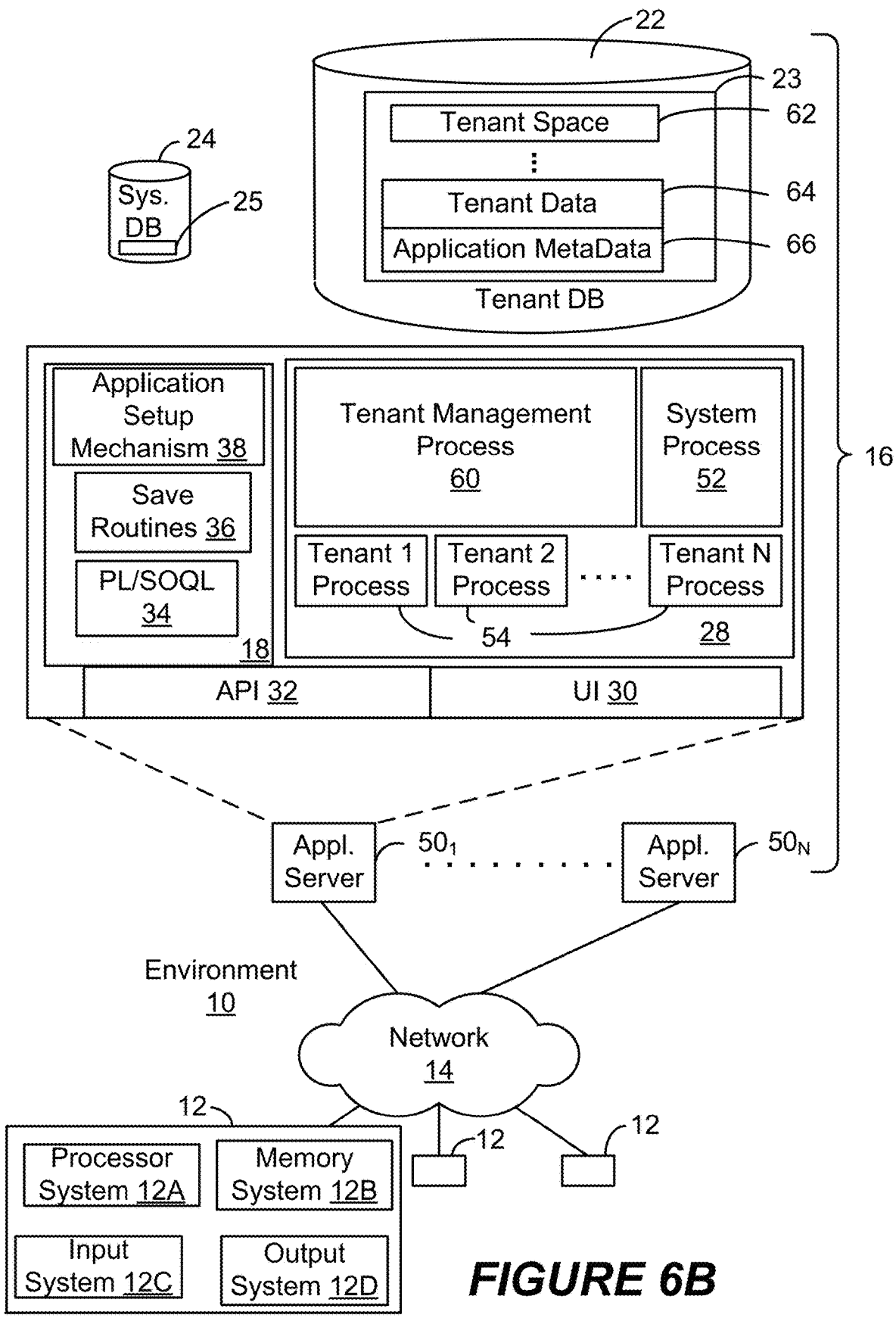
FIG. 6B shows a block diagram of an example of some implementations of elements of FIG. 8A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
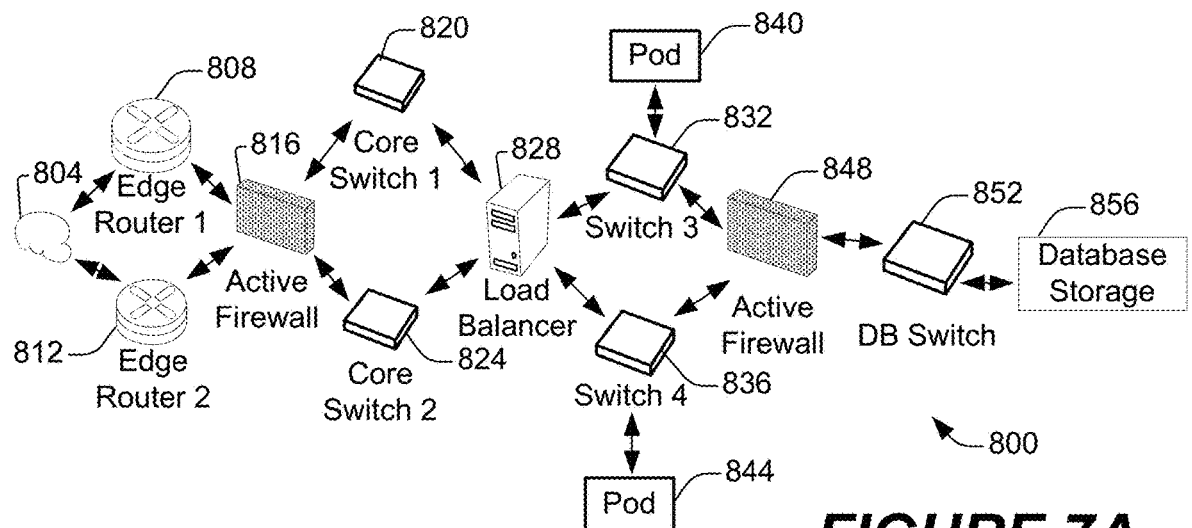
FIG. 7A shows a system diagram of an example of architectural components of an on-demand database service environment 900, in accordance with some implementations.

FIG. 7A shows a system diagram illustrating an example of architectural components of an on-demand database service environment 800 according to some implementations. A client machine located in the cloud 804, generally referring to one or more networks in combination, as described herein, may communicate with the on-demand database service environment via one or more edge routers 808 and 812. A client machine can be any of the examples of user systems 12 described above. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand database service environment may communicate with a database storage 856 via a database firewall 848 and a database switch 852.

Figure 7B:
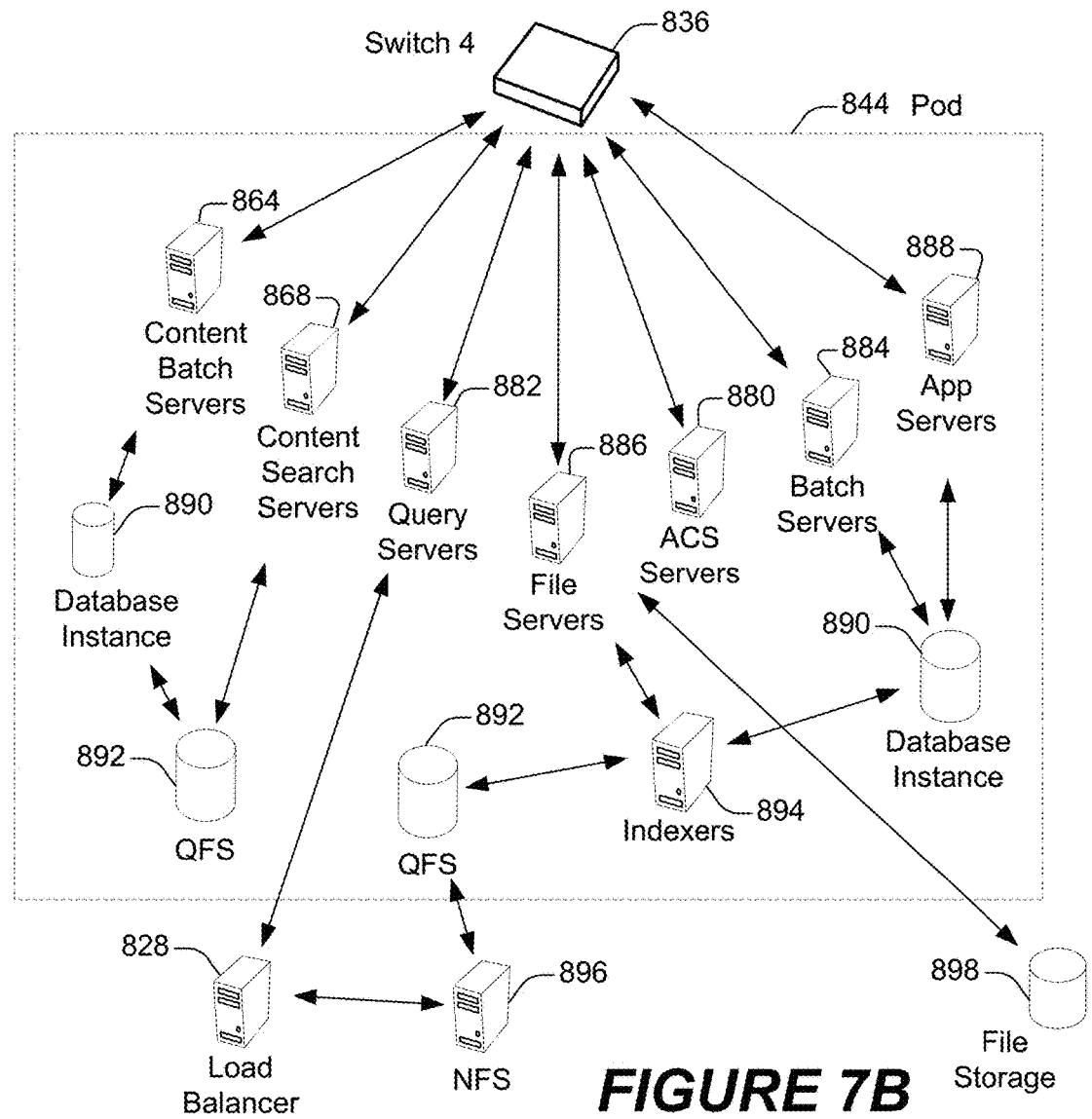
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 800 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand database service environment to access services provided by the on-demand database service environment. For example, client machines may access the on-demand database service environment to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The BGP is the core routing protocol of the Internet. The edge routers 808 and 812 may maintain a table of IP networks or 'prefixes', which designate network reachability among autonomous systems on the Internet.

In one or more implementations, the firewall 816 may protect the inner components of the on-demand database service environment 800 from Internet traffic. The firewall 816 may block, permit, or deny access to the inner components of the on-demand database service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 may be configured as network bridges that quickly route data between different components within the on-demand database service environment. In some implementations, the use of two or more core switches 820 and 824 may provide redundancy and/or reduced latency.

In some implementations, the pods 840 and 844 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage 856 may be conducted via the database switch 852. The multi-tenant database storage 856 may include more than one hardware and/or software components for handling database queries. Accordingly, the database switch 852 may direct database queries transmitted by other components of the on-demand database service environment (e.g., the pods 840 and 844) to the correct components within the database storage 856.

In some implementations, the database storage 856 is an on-demand database system shared by many different organizations. The on-demand database system may employ a multi-tenant approach, a virtualized approach, or any other type of database approach. An on-demand database system is discussed in greater detail with reference to FIGS. 7A and 7B.

FIG. 7B shows a system diagram further illustrating an example of architectural components of an on-demand database service environment according to some implementations. The pod 844 may be used to render services to a user of the on-demand database service environment 800. In some implementations, each pod may include a variety of servers and/or other systems. The pod 844 includes one or more content batch servers 864, content search servers 868, query servers 882, file servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the app servers 888 may include a hardware and/or software framework dedicated to the execution of procedures (e.g., programs, routines, scripts) for supporting the construction of applications provided by the on-demand database service environment 800 via the pod 844. In some implementations, the hardware and/or software framework of an app server 888 is configured to execute operations of the services described herein, including performance of the blocks of methods described with reference to FIGS. 1-4. In alternative implementations, two or more app servers 888 may be included and cooperate to perform such methods, or one or more other servers described herein can be configured to perform the disclosed methods.

The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand database service environment.

The file servers 886 may manage requests for information stored in the File storage 898. The File storage 898 may store information such as documents, images, and basic large objects (BLOBs). By managing requests for information using the file servers 886, the image footprint on the database may be reduced.

The query servers 882 may be used to retrieve information from one or more file systems. For example, the query system 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may call upon various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, California. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 828, which may distribute resource requests over various resources available in the on-demand database service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without using an additional database call.

In some implementations, database information may be transmitted to the indexer 894. Indexer 894 may provide an index of information available in the database 890 and/or QFS 892. The index information may be provided to file servers 886 and/or the QFS 892.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method, comprising:
    identifying a user of a client device based, at least in part, on a message received from the client device;
    obtaining a set of privacy settings associated with the user, the set of privacy settings including one or more indicators, at least one indicator indicating whether access to a value of a corresponding one of a plurality of contextual features is permissible, the plurality of contextual features including one or more tenant features;
    identifying, in a database, a user profile associated with the user;
    identifying a tenant associated with the user, the tenant being one of a plurality of tenants of a multi-tenant database;
    ascertaining a context of the user according to the set of privacy settings based, at least in part, on the user profile and tenant information associated with the tenant, the tenant information indicating one or more resources available to the tenant, the context including values corresponding to at least a portion of the plurality of contextual features;
    generating a recommendation based, at least in part, on the context; and
    providing the recommendation.

2. The method as recited in claim 1, the context including at least one value corresponding to at least one tenant feature of the tenant features.

3. The method as recited in claim 1, the tenant features comprising one or more of: a number of feature licenses purchased, a number of feature licenses used, a number of feature licenses available, a number of user licenses purchased, a number of user licenses used, a number of user licenses available, a maximum amount of storage available, an amount of storage used, or an amount of storage remaining.

4. The method as recited in claim 1, the tenant features comprising one or more of: a product, a product edition, a product status, a product feature set, or an amount of time remaining in a trial period for the product.

5. The method as recited in claim 1, at least one of the indicators indicating whether access to a value of a corresponding one of the user features is permissible.

6. The method as recited in claim 1, the user features comprising one or more of: a user license type, a user profile type, a user role, or recent online activities.

7. The method as recited in claim 1, the method further comprising:
    generating the recommendation by applying the context using a machine learning model including a plurality of weights, each of the weights corresponding to a different one of the plurality of contextual features.

8. A system comprising:
    a database system implemented using a server system, the database system configurable to cause:
    identifying a user of a client device based, at least in part, on a message received from the client device;
    obtaining a set of privacy settings associated with the user, the set of privacy settings including one or more indicators, at least one indicator indicating whether access to a value of a corresponding one of a plurality of contextual features is permissible, the plurality of contextual features including one or more tenant features;
    identifying, in a database, a user profile associated with the user;

identifying a tenant associated with the user, the tenant being one of a plurality of tenants of a multi-tenant database;

ascertaining a context of the user according to the set of privacy settings based, at least in part, on the user profile and tenant information associated with the tenant, the tenant information indicating one or more resources available to the tenant, the context including values corresponding to at least a portion of the plurality of contextual features;

generating a recommendation based, at least in part, on the context; and providing the recommendation.

9. The system as recited in claim 8, the context including at least one value corresponding to at least one tenant feature of the tenant features.

10. The system as recited in claim 8, the tenant features comprising one or more of: a number of feature licenses purchased, a number of feature licenses used, a number of feature licenses available, a number of user licenses purchased, a number of user licenses used, a number of user licenses available, a maximum amount of storage available, an amount of storage used, or an amount of storage remaining.

11. The system as recited in claim 8, the tenant features comprising one or more of: a product, a product edition, a product status, a product feature set, or an amount of time remaining in a trial period for the product.

12. The system as recited in claim 8, at least one of the indicators indicating whether access to a value of a corresponding one of the user features is permissible.

13. The system as recited in claim 8, the user features comprising one or more of: a user license type, a user profile type, a user role, or recent online activities.

14. The system as recited in claim 8, the database system further configurable to cause:

generating the recommendation by applying the context using a machine learning model including a plurality of weights, each of the weights corresponding to a different one of the plurality of contextual features.

15. A computer program product comprising computer-readable program code capable of being executed by one or more processors when retrieved from a non-transitory computer-readable medium, the program code comprising computer-readable instructions configurable to cause:

identifying a user of a client device based, at least in part, on a message received from the client device;

obtaining a set of privacy settings associated with the user, the set of privacy settings including one or more indicators, at least one indicator indicating whether access to a value of a corresponding one of a plurality of contextual features is permissible, the plurality of contextual features including one or more tenant features;

identifying, in a database, a user profile associated with the user;

identifying a tenant associated with the user, the tenant being one of a plurality of tenants of a multi-tenant database;

ascertaining a context of the user according to the set of privacy settings based, at least in part, on the user profile and tenant information associated with the tenant, the tenant information indicating one or more resources available to the tenant, the context including values corresponding to at least a portion of the plurality of contextual features;

generating a recommendation based, at least in part, on the context; and providing the recommendation.

16. The computer program product as recited in claim 15, the context including at least one value corresponding to at least one tenant feature of the tenant features.

17. The computer program product as recited in claim 8, the tenant features comprising one or more of: a number of feature licenses purchased, a number of feature licenses used, a number of feature licenses available, a number of user licenses purchased, a number of user licenses used, a number of user licenses available, a maximum amount of storage available, an amount of storage used, or an amount of storage remaining.

18. The computer program product as recited in claim 8, the tenant features comprising one or more of: a product, a product edition, a product status, a product feature set, or an amount of time remaining in a trial period for the product.

19. The computer program product as recited in claim 8, at least one of the indicators indicating whether access to a value of a corresponding one of the user features is permissible.

20. The computer program product as recited in claim 8, the user features comprising one or more of: a user license type, a user profile type, a user role, or recent online activities.

* * * * *